UNITED STATES PATENT OFFICE.

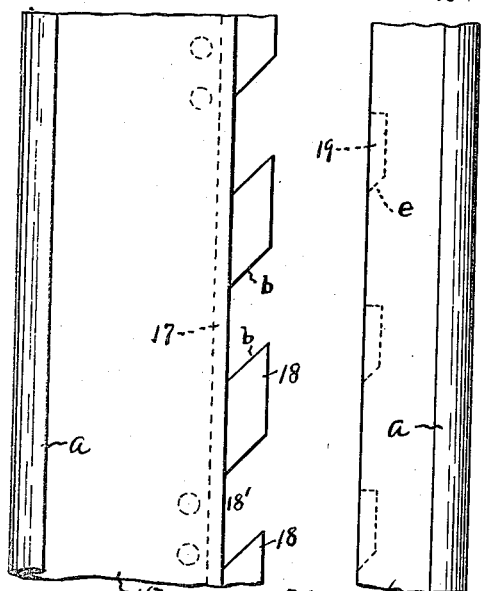
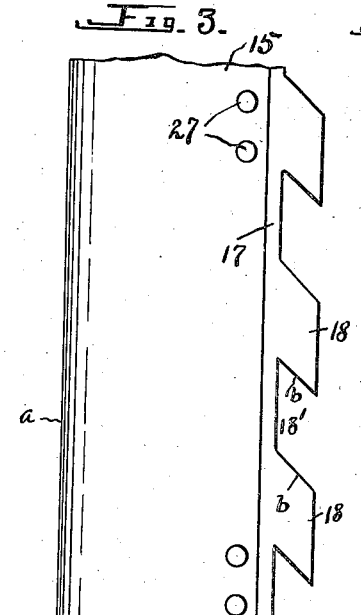
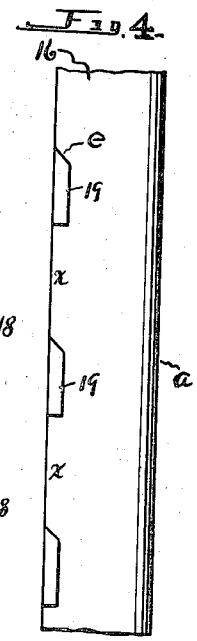
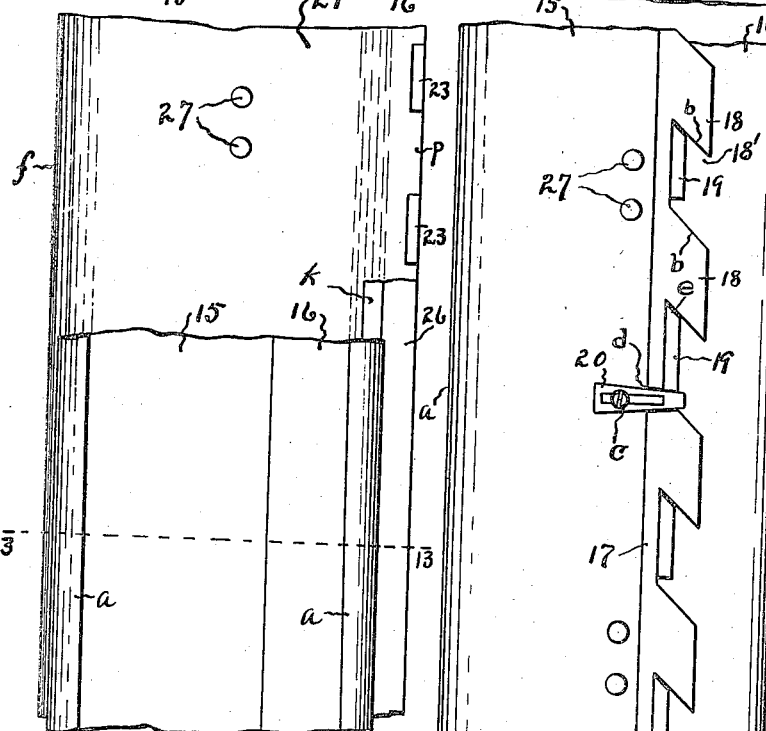
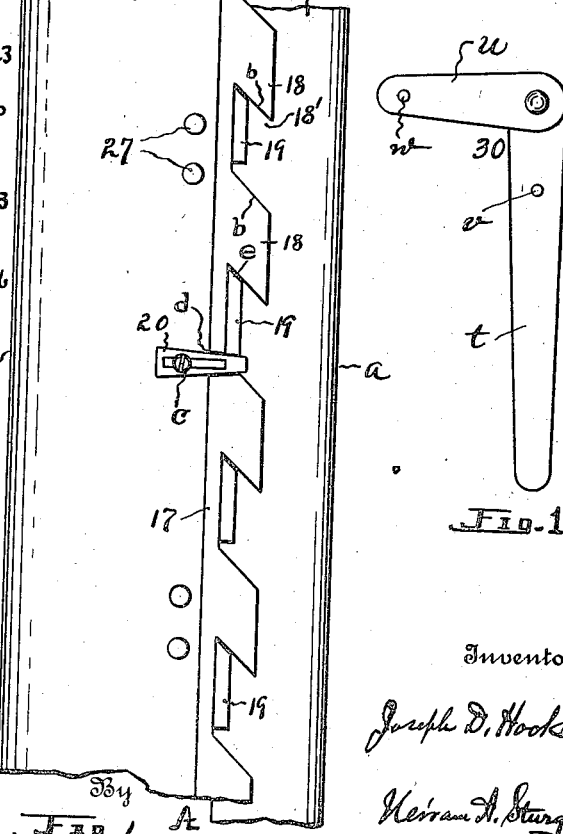

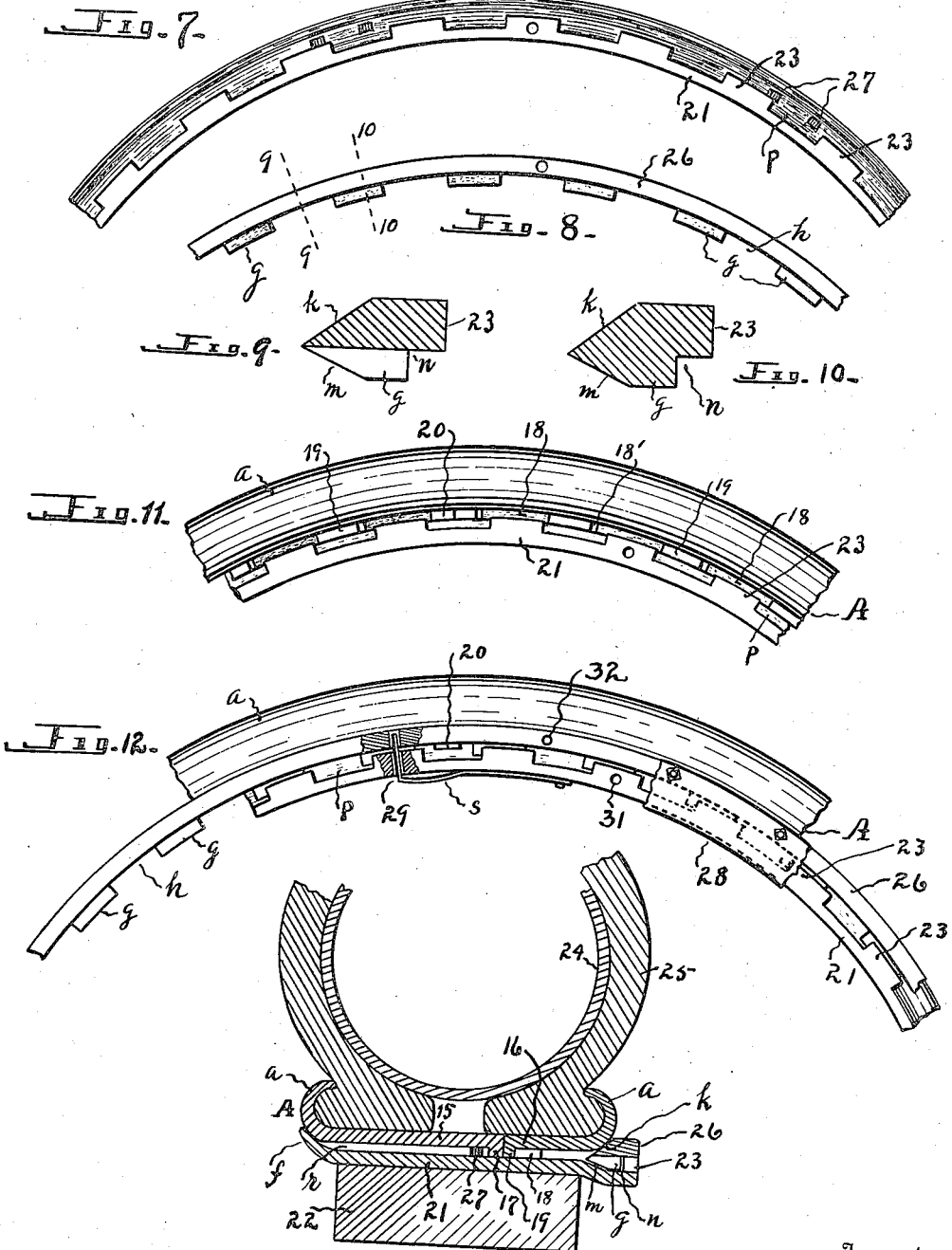

JOSEPH D. HOOKER, OF CARSON, IOWA, ASSIGNOR OF ONE-FOURTH TO THEODORE G. NORTHWALL AND ONE-FOURTH TO FRANK REED, BOTH OF OMAHA, NEBRASKA.

DEMOUNTABLE RIM FOR VEHICLE-TIRES.

1,142,962.  Specification of Letters Patent.  Patented June 15, 1915.

Application filed January 31, 1914. Serial No. 815,681.

*To all whom it may concern:*

Be it known that I, JOSEPH D. HOOKER, a citizen of the United States, residing at Carson, in the county of Pottawattamie and State of Iowa, have invented certain new and useful Improvements in Demountable Rims for Vehicle-Tires, of which the following is a specification.

This invention relates to an improvement in detachable rims for vehicle tires, and has for its principal object to provide rim sections which may be quickly and conveniently mounted upon or removed from the wheel.

The invention consists of the novel construction, combination and arrangement of parts as described herein and claimed, and as illustrated in the drawing, wherein—

Figures 1, 2, 3, 4, 5 and 6 are broken away detail views to clearly show construction of the two-part detachable rim embodying the invention. Fig. 1 is a view showing the outer side of one of the sections or female member of the detachable rim. Fig. 2 shows the outer side of the other section or male portion of the detachable rim. Fig. 3 is a view of the inner side of that part of the rim section shown in Fig. 1. Fig. 4 is a view of the inner side of that part of the rim section shown in Fig. 2. Fig. 5 is a plan view showing the two members or sections of the detachable rim when assembled, a bearing-rim and a locking-ring being added. Fig. 6 is a view showing the inner side of the detachable rim, the two sections thereof being removably connected by a keeper or wedge. Fig. 7 is a side view showing a part of a bearing-rim. Fig. 8 is a side view showing a part of a locking ring. Fig. 9 is a transverse section on line 9 9 of Fig. 8, the scale being enlarged. Fig. 10 is a transverse section on line 10 10 of Fig. 8. Fig. 11 is a view showing the detachable rim mounted on a bearing-rim. Fig. 12 is a view similar to that shown in Fig. 11, a locking-ring, a coupling member and a dust guard being added. Fig. 13 is a transverse section on line 13 13 of Fig. 5, a pneumatic tire and casing, partly broken away, being added. Fig. 14 shows a side view of a tool used for moving the wedge and locking-ring.

Referring now to the drawing for a more particular description, the tire-support or detachable rim A, shown in Fig. 6, consists of the rim sections 15 and 16, each having an outwardly projecting, longitudinal, endless flange $a$ near its outer edge, the inner side of the rim section 15 being provided near its inner edge with a longitudinal projection or ridge 17, said ridge being provided at longitudinal intervals with lugs 18 to form recesses 18′ between their adjacent, substantially parallel, inclined walls $b$, and at longitudinal intervals on the inner side of the rim section 16, opposite to its flange $a$, are provided the projections or lugs 19, and intermediate recesses $x$.

Rim section 16 may be disposed with its lugs 19 engaging in recesses 18′ of rim section 15, and these sections may be connected by means of the keeper latch or wedge 20 which is mounted on rim section 15, said wedge having a slot traversed by the pin or holder $c$. It is obvious that if the wedge has a sliding movement transversely of these rim sections so that it will engage in the recess $d$ formed in the ridge 17 to abut upon the end of a lug 19, members 15 and 16 will be securely connected; and if the wedge is withdrawn from its engagement with lug 19, members 15 and 16 may be separated.

Lugs 19 are each formed with a tapered terminal $e$, corresponding to the inclination of walls $b$ of lugs 18, and they have a length less than the length of these recesses. Since the wedge is formed tapered or convergent from its mounting, members 15 and 16 may be loosely connected whenever desired, the wedge being partly withdrawn from recess $d$ for this purpose.

At 21 is indicated a bearing-rim adapted to be mounted upon the felly 22. It is provided, at longitudinal intervals, near one of its edges with outwardly projecting lugs 23 and with intermediate recesses $p$, and is transversely curved at or near its opposite edge as indicated at $f$. In operation, before the pneumatic tire 24 is inflated, the casing 25 may be mounted upon rim sections 15 and 16, and these sections may then be connected by means of the wedge 20, as described. Said rim sections, carrying the pneumatic tire and casing, may then be placed upon the bearing rim, and for this purpose it may have a free sliding movement transversely of said bearing rim.

At 26 is indicated a locking ring, provided at longitudinal intervals on its inner side with lugs $g$, and intermediate of said lugs with recesses $h$, and having an annular, inclined bearing-wall $k$ intermediate of its periphery and inner edge. Lugs $g$ preferably have an inwardly inclined wall $m$, as best shown in Figs. 9 and 10, and have a width less than the width of the locking ring to provide recesses $n$ intermediate of their outer ends and the outer end of said locking ring.

Recesses $h$ have a greater length than the length of lugs 23 of the bearing rim, and recesses $p$ of the bearing rim have a greater length than the length of lugs $g$ of the locking ring, and therefore said ring may be mounted upon the bearing rim for the purpose of causing engagement of its inclined wall $k$ with the outer, curved part $a$ of member 16 for preventing a transverse movement of the detachable rim A from said mounting. The locking ring may have a rotatable movement when mounted upon the bearing rim to dispose its lugs inwardly of and in engagement with the lugs of said bearing rim, the lugs of the bearing rim being disposed in recesses $n$ of the locking ring.

The bearing rim, on its outer side, and member 15 of the detachable rim, in its inner side, are provided with spacing-lugs or detents 27, disposed at longitudinal intervals, and when members 15 and 16 are connected by the wedge 20, the lugs 27 of member 15 and the bearing rim will be disposed in alinement to prevent creeping or movement of the detachable rim longitudinally of the bearing rim; also the employment of lugs 27 permit the detachable rim to be disposed outwardly of the bearing rim a sufficient distance to provide, when the parts are assembled, a suitable space or chamber $r$ (Fig. 13.) between said rims, this being a matter of convenience when mounting or demounting the detachable rim.

At 28 is indicated an annular dust guard, adapted to be secured upon the outer side of the locking ring to operate as a cover for the recesses $h$ and $p$ and prevent dust or sand from entering therein.

At 29 (Fig. 12.) is indicated a coupling pin mounted on the inner side of the bearing rim, adapted to engage in suitable apertures formed in the bearing rim and locking ring for the purpose of preventing a rotatable movement of the locking ring after the parts have been assembled. Since the pin 29 is provided with a spring $s$ it will normally be disposed in these apertures, but may be manually withdrawn when it is desired to remove the locking ring from its mounting.

In operation, after the pneumatic tire and casing have been mounted on the wheel, wedge 20 may be moved outwardly of recess $d$ by use of any elongated member such as an ordinary knife blade or the handle $t$ of the wrench 30 (Fig. 14.), and from the description it will be understood that the normal pressure of the pneumatic tire will cause member 16 of the detachable rim to move transversely of the bearing rim to thereby move the locking ring transversely of the wheel, so that vibration will be prevented. As clearly shown in Fig. 12, the locking ring fits loosely on the bearing rim so that it may be conveniently and readily removed or mounted thereon, and the "spreading" permitted by the peculiar construction of the lugs and recesses of the members of the detachable rim when wedge 20 is moved outwardly of recess $d$, is depended upon, in combination with the compression of the rubber or flexible parts of the tire, for causing member 15 to be pressed against the locking ring, and for causing the locking ring to be pressed against the lugs 23 of the bearing rim, to prevent the vibration mentioned.

While a pneumatic tire 24 is shown in the drawing, solid rubber tires (not shown) or tires constructed of other flexible material may, of course, be used and mounted upon the detachable rim A, and I do not wish to be understood as limiting myself in this respect.

The tool or wrench 30 may be used to advantage for longitudinally moving the locking ring. It consists of the handle $t$ upon which is pivotally mounted an arm $u$. The handle and its arm are provided, respectively, with lugs $v$ and $w$. At 31 and 32 are indicated apertures formed respectively in the bearing rim and locking ring, in which the lugs of the wrench 30 may engage when it is desired to move the locking ring.

Among some of the advantages to be derived by use of the invention, it may be stated that the detachable rim A may be conveniently slid transversely over the bearing rim for its mounting or removal, since, by use of lugs 27, ridge 17 and lugs 19, it is maintained at a suitable distance outwardly of the bearing rim. Also, since members 15 and 16 are separable after all of the parts have been assembled, the pressure of the rubber tire may be distributed equally; flange $a$ of member 15 will automatically be pressed outwardly against the curved part $f$ of the bearing rim and flange $a$ of member 16 will be pressed outwardly against the bearing wall $k$ of the locking ring, and vibration of all contacting parts will be prevented; and if a "blow-out" occurs, the rim sections may be quickly demounted, since no screws or bolts are employed.

Having fully described the several parts, a further explanation relating to operation is not required.

What I claim and desire to secure by Letters Patent is,—

1. In devices for the purpose described, a bearing rim provided at longitudinal intervals with lugs and intermediate of said lugs with recesses, a tire-supporting rim consisting of a plurality of connected longitudinal sections adapted to be moved transversely of the bearing rim for mounting thereon or removal therefrom, a locking ring provided at longitudinal intervals with lugs and intermediate of said lugs with recesses, said locking ring being adapted to have a movement longitudinally of the bearing rim for mounting thereon adjacent to the tire-supporting rim with its lugs disposed inwardly of the lugs of said bearing rim, a keeper adapted to traverse the bearing rim and locking ring for preventing relative longitudinal movements thereof, and means operative when the sections are in engagement with the tire for disconnecting said sections to permit lateral expansion of said tire-supporting rim for causing a pressure thereof against the locking ring, the operation being that the pressure against said locking ring of the tire-supporting rim may cause the lugs of the locking ring to be pressed against the lugs of said bearing rim.

2. In devices for the purpose described, a bearing rim, a tire-supporting rim consisting of a plurality of connected longitudinal sections adapted to be moved transversely of the bearing rim for mounting thereon or removal therefrom, a locking ring provided with an annular dust guard and adapted to be moved longitudinally for mounting on the bearing rim adjacent to the tire-supporting rim, a keeper adapted to traverse the bearing rim and locking ring for preventing a longitudinal movement of the locking ring relative to the bearing rim, and means operative when the sections are in engagement with the tire for disconnecting said sections to permit lateral expansion of said tire-supporting rim.

In testimony whereof, I have affixed my signature in presence of two witnesses.

JOSEPH D. HOOKER.

Witnesses:
   CLYDE HOOKER,
   EARL M. DREW.